(12) United States Patent
Giraudet et al.

(10) Patent No.: US 12,399,383 B2
(45) Date of Patent: Aug. 26, 2025

(54) LENS ELEMENT AND CORRESPONDING COMPUTER-IMPLEMENTED DETERMINING METHOD

(71) Applicant: Essilor International, Charenton-le-Pont (FR)

(72) Inventors: Guillaume Giraudet, Orleans (FR); Matthieu Guillot, Issy les Moulineaux (FR); Bruno Fermigier, Maisons Alfort (FR)

(73) Assignee: Essilor International, Charenton-le-Pont (FR)

( * ) Notice: Subject to any disclaimer, the term of this patent is extended or adjusted under 35 U.S.C. 154(b) by 357 days.

(21) Appl. No.: 18/065,300

(22) Filed: Dec. 13, 2022

(65) Prior Publication Data

US 2023/0185111 A1    Jun. 15, 2023

(30) Foreign Application Priority Data

Dec. 15, 2021  (EP) .................................... 21306784

(51) Int. Cl.
*G02C 7/02* (2006.01)
*G02C 7/06* (2006.01)

(52) U.S. Cl.
CPC ............... *G02C 7/022* (2013.01); *G02C 7/06* (2013.01)

(58) Field of Classification Search
CPC .......... G02C 7/022; G02C 7/06; G02C 7/027; G02C 2202/20

(Continued)

(56) References Cited

U.S. PATENT DOCUMENTS

| 2011/0313058 A1 | 12/2011 | Neitz et al. |
| 2013/0278888 A1 | 10/2013 | Bakaraju et al. |

(Continued)

FOREIGN PATENT DOCUMENTS

| CN | 112437897 A | 3/2021 |
| CN | 112534340 A | 3/2021 |

(Continued)

OTHER PUBLICATIONS

European Search Report issued Jun. 8, 2022 in European Application 21306784.6 filed on Dec. 15, 2021 citing documents 1-22 and 28 therein 13 pages.

(Continued)

*Primary Examiner* — William R Alexander
(74) *Attorney, Agent, or Firm* — Oblon, McClelland, Maier & Neustadt, L.L.P.

(57) ABSTRACT

The invention relates to a lens element (1) intended to be worn by a wearer, comprising at least one prescription portion (2) having a first optical function configured to provide a dioptric correction of an eye of the wearer when the lens element (1) is worn by said wearer based on a prescription of the wearer, and a plurality of lenslets (3), each lenslet (3) of said plurality of lenslets being configured to provide at least one second optical function which differs from the first optical function,
wherein each lenslet (3) has a shape, a size and a position such that at least one portion of said lens element (1) has a modulation transfer function (MTF) whose values are configured so that the modulation transfer function of said lens element 1 over a range of spatial frequencies comprised between 1 and 5 cycles per degree are lower or equal to 0.6.

15 Claims, 6 Drawing Sheets

(58) Field of Classification Search
USPC .................................................. 351/159.48
See application file for complete search history.

(56) References Cited

U.S. PATENT DOCUMENTS

| | | |
|---|---|---|
| 2015/0153587 A1 | 6/2015 | Bakaraju et al. |
| 2015/0185501 A1 | 7/2015 | Bakaraju et al. |
| 2017/0115508 A1 | 4/2017 | Bakaraju et al. |
| 2017/0212363 A1 | 7/2017 | Bakaraju et al. |
| 2017/0336655 A1 | 11/2017 | Neitz et al. |
| 2018/0335648 A1 | 11/2018 | Bakaraju et al. |
| 2019/0227344 A1 | 7/2019 | Bakaraju et al. |
| 2019/0235278 A1 | 8/2019 | Bakaraju et al. |
| 2019/0302477 A1 | 10/2019 | Neitz et al. |
| 2020/0073147 A1 | 3/2020 | Bakaraju et al. |
| 2020/0393699 A1 | 12/2020 | Neitz et al. |
| 2021/0191157 A1 | 6/2021 | Bakaraju et al. |
| 2021/0271110 A1 | 9/2021 | Bakaraju et al. |
| 2021/0271112 A1* | 9/2021 | Qi ............................. G02B 1/11 |
| 2021/0341753 A1 | 11/2021 | Neitz et al. |
| 2022/0011602 A1 | 1/2022 | Chalberg et al. |
| 2022/0057293 A1* | 2/2022 | Qi ...................... G01M 11/0228 |
| 2022/0146857 A1 | 5/2022 | Hones, Jr. et al. |
| 2022/0244567 A1* | 8/2022 | Qi ...................... B29D 11/0073 |

FOREIGN PATENT DOCUMENTS

| | | |
|---|---|---|
| SG | 1120 2105 048 U | 6/2021 |
| WO | WO 2010/075319 A2 | 7/2010 |
| WO | WO 2020/069232 A1 | 4/2020 |
| WO | WO 2020/180817 A1 | 9/2020 |

OTHER PUBLICATIONS

O'Hare, L. et al. "Spatial frequency and visual discomfort" Vision Research vol. 51 No. 15, Jun. 13, 2011 (11 pages).

Yuliang et al., "Ophthalmic Optics", People's Military Medical Publishing House, pp. 112-113, Aug. 31, 2008, with machine English translation. (10 pages).

Office Action dated Apr. 27, 2025, issued in counterpart CN Application No. 202211613351.0, citing documents, No. 15-16 and 23. (19 pages).

* cited by examiner

LENS ELEMENT AND CORRESPONDING COMPUTER-IMPLEMENTED DETERMINING METHOD

TECHNICAL FIELD OF THE INVENTION

The invention relates to the fields of ophthalmic lenses and optical design. More precisely, the invention relates to a lens element intended to be worn by a wearer, comprising at least one prescription portion having a first optical function configured to provide a dioptric correction of an eye of the wearer when the lens element is worn by said wearer based on a prescription of the wearer, and a plurality of lenslets each lenslet of said plurality of lenslets being configured to provide at least one second optical function which differs from the first optical function.

The invention relates also to a computer-implemented method for determining a lens element intended to be worn by a wearer.

BACKGROUND INFORMATION AND PRIOR ART

Visual stress refers to a condition in which unpleasant visual and vision-related symptoms are experienced when reading. Many ophthalmic devices, particularly eyeglasses, have been developed to help dyslexics and people suffering from visual stress to reduce the symptom of asthenopia and improve visual performances and comfort in reading activities. The most known technique consists in providing spectacles with tinted lenses. However, these tinted lenses lack aesthetics and discretion in daily usage. Furthermore, they significantly modify color perception and may affect color discrimination performances. Besides, when they are worn all day long, these lenses may also affect the circadian rhythm control, and hence induce general fatigue and sleep issues.

SUMMARY OF THE INVENTION

Therefore one object of the invention is to provide an alternative solution to the prior art for visual comfort and reading skills improvement in people suffering from visual stress.

The above object is achieved according to the invention by a lens element intended to be worn by a wearer, comprising at least one prescription portion having a first optical function configured to provide a dioptric correction of an eye of the wearer when the lens element is worn by said wearer based on a prescription of the wearer, and a plurality of lenslets, each lenslet of said plurality of lenslets being configured to provide at least one second optical function which differs from the first optical function, wherein each lenslet has a shape, a size and a position such that at least one portion of said lens element has a modulation transfer function whose values are configured so that the modulation transfer function of said lens element 1 over a range of spatial frequencies comprised between 1 and 5 cycles per degree.

One advantage of the lens element according to the invention is to remove a range of spatial frequencies centered around, for example around 3 cycles per degree. Those frequencies, when contained in visual stimuli, like texts, overstimulate a hyper-excitable visual cortex and causing visual stress. Therefore, while removing those frequencies, the lens element according to the invention reduces visual stress and improves visual comfort and ease of patients suffering from this phenomenon.

According to an embodiment, the modulation transfer function is calculated or computed for wavelength comprised between 400 and 780 nm, preferably for a wavelength of 550 nm.

According to an embodiment, the modulation transfer function is calculated or computed for a given pupil diameter.

Typically, the given pupil diameter is comprised between 4 and 8 millimeters.

In an embodiment:
  each lenslet of said plurality of lenslets has a diameter between 0.1 mm and 2.5 mm,
  each lenslet of said plurality of lenslets has another lenslet in its vicinity;
  the density of the lenslets over a predetermined portion of said lens element is greater than 30%.

The density of the lenslets over a predetermined portion of the lens element can be defined as the ratio between the total surface of the lenslets and the area of the predetermined portion.

In the following, the wording "predetermined portion of the lens element" refers:
  to the at least one portion of said lens element 1 having a modulation transfer function whose values are lower than 0.6 over the range of spatial frequencies comprised between 1 to 5 cycles per degree, or
  to a sub-portion of the at least one portion of said lens element 1 having the modulation transfer function whose values are lower than 0.6 over the range of spatial frequencies comprised between 1 to 5 cycles per degree, or
  to any portion of the lens element 1 comprising lenslets.

In an embodiment, the density of the lenslets over the at least one portion of said lens element is greater than 30%.

In an embodiment, the density of the lenslets over the at least one portion of said lens element is greater than 40%.

Typically, the density of the lenslets over the at least one portion of said lens element is comprised between 30% and 50% (for non-contiguous lenslets).

In an embodiment, the density of the lenslets over any portion of the lens element is greater than 30%.

In an embodiment, the density of the lenslets over any portion of the lens element is greater than 40%.

Typically, the density of the lenslets over any portion of said lens element is comprised between 30% and 50% (for non-contiguous lenslets).

According to an embodiment, the modulation transfer function of the at least one portion of the lens element presents at least one valley over the range of spatial frequencies comprised between 2 and 6 cycles per degree.

Typically, the at least one valley presents a minimum value comprised between 0.40 and 0.50.

According to an embodiment, the modulation transfer function of the at least one portion of the lens element presents at least one peak over the range of spatial frequencies comprised between 3 and 8 cycles per degree.

In an embodiment, the at least one peak presents a maximum value comprised between 0.40 and 0.60, typically between 0.40 and 0.50.

In an embodiment, the maximum value of the peak is higher than the minimum value of the valley.

For example, a lenslet vicinity may be a zone of 3 mm surrounding the contour of the lenslet.

In an embodiment, the value of modulation transfer function of the lens element at a spatial frequency of 3 cycles per degree is lower or equal to 0.4.

In some examples, the value of the modulation transfer function of the lens element is higher than 0.6 for a spatial frequency below 1 cycle per degree. More preferably, the value of the modulation transfer function of the lens element is higher than 0.2, preferably higher than 0.4 for a spatial frequency between 5 cycles per degree and 15 cycles per degree.

In an embodiment, the lens element comprises a front surface and a rear surface, said rear surface being closer to the eye of the wearer when the lens element is worn by the wearer, wherein the lenslets are located on one of the two surfaces and/or between the two surfaces.

In an embodiment, at least a first part of the plurality of lenslets are contiguous.

When the lenslets are contiguous, the density of the lenslets over the at least one portion of the lens element is greater than 70%.

Typically, when the lenslets are contiguous, the density of the lenslets over the at least one portion of said lens element is comprised between 70 percent and 100 percent.

When the lenslets are contiguous, the density of the lenslets over any portion of the lens element is greater than 70%. In an embodiment, at least a second part of the plurality of lenslets are arranged according to a predefined pattern. Typically, the predefined pattern is selected among a linear pattern, a hexagonal pattern, a ring shape, a spiral shape, etc.

In some examples, the first part and the second part might be the same part.

The predefined pattern may be hexagonal.

In a variant, at least two lenslets of said at least the second part of the plurality of lenslets are arranged to form a horizontal line.

In some embodiments, at least two lenslets of at least the second part of the plurality of lenslets are unifocal and arranged contiguously.

In an embodiment, each lenslet of at least a third part of the plurality of lenslets has a surface shape being spherical, or aspherical or torical when covered by a coating or under a coating.

In some embodiments, each lenslet of at least a third part of the plurality of lenslets is unifocal and has a mean optical power comprised between 12 and 22 diopters.

In an example, each lenslet of the at least third part has a diameter comprised between 0.1 and 0.7 mm.

In an example, the first part of plurality of lenslets comprises 30% of the total number of the lenslets, The lenslets of the first part may be contiguous lenslets and may be located in an upper part of the lens, while the second part of the plurality of lenslets comprises 70% of the total number of lenslets. In this example, the lenslets of the second part may be not contiguous but arranged in a linear pattern in the lower part of the lens.

By upper part of the lens element, it is meant a half part of the lens element positioned above one of the radial axes of the lens element (here axis x or the axis y defined in the lens element). In contrast, by lower part of the lens element, it is meant the other half part of the lens element positioned below one of the radial axes of the lens element (similarly the axis x or the axis y defined in the lens element).

In another example, the second part of plurality of lenslets comprises 70% of the total number of lenslets while the third part of plurality of lenslets comprises 30% of the total number of lenslets. Typically, the lenslets of the second part may be contiguous and arranged according to a linear pattern, for example in the lower part of the lens, whereas the third part of plurality of lenslets may be randomly arranged in the upper part of the lens element. The lenslets of the third part may be unifocal lenslets with a high optical power. In some examples, the third part might be the same part as the first part and/or the second part.

In an example, the first part may be the same part as the second part. In an embodiment, the lenslets of the first and second parts are arranged according to a horizontal line continuously.

In another embodiment, the second part may be the same part as the third part.

In an embodiment, each lenslet has at least one second optical function that is multifocal.

In some embodiments, the lenslets have a bifocal second optical function and comprise a first portion and a second portion, wherein:
the first portion is a central circular zone of diameter comprised between 0.5 and 1.5 mm,
the second portion is a peripheral annular zone of external diameter comprised between 1 and 3 mm.

In some embodiments, each lenslet has a bifocal second optical function and is diffractive Pi-Fresnel lenslet.

For instance, the diffractive Pi-Fresnel lenslet provides a first main diffractive order and a second diffractive order, wherein:
the first main diffractive order configured to produce a first dioptric power comprised in a range of +/−0.12 diopter centered around a prescription optical power of the prescription portion,
the second diffractive order configured to produce a second dioptric power such that the absolute value of the difference between the prescription optical power and the second optical power is comprised between 1 diopter and 10 diopters.

The invention also relates to a computer-implemented method for determining a lens element intended to be worn by a wearer, wherein the lens element comprises a prescription portion having a first optical function configured to provide a dioptric correction based on a prescription of the wearer, and a plurality of lenslets in contact with said prescription portion, each of said lenslets providing at least one optical function which is different from the first optical function of said prescription portion;
wherein the method comprises:
providing (S1) a prescription for correcting vision of an eye of the wearer,
determining (S2) a shape, a size and a location of each lenslet so that at least one portion of said lens element comprises a modulation transfer function (MTF) whose values over a range of spatial frequencies comprised between 1 and 5 cycles per degree are lower or equal to 0.6.

In some embodiments, the method comprises:
arranging (S3) lenslets according to a predefined regular pattern of adjacent lenslets, said predefined regular pattern having a constant inter-distance between two geometrical centers of adjacent lenslets,
adjusting (S4) the inter-distance between two geometrical centers of adjacent lenslets so as to have a random or pseudo-random arrangement.

A further object of the invention is to provide a method for manufacturing a lens element comprising:
a step of determining a design of the lens element using the computer-implemented method as disclosed above, a step of manufacturing the lens element following the design.

In the following, the wording modulation rate or value of the modulation transfer function refers to the amplitude of the modulation transfer function.

DETAILED DESCRIPTION OF ONE EXAMPLE

The following description, enriched with joint drawings that should be taken as non limitative examples, will help understand the invention and figure out how it can be realized.

Visual stress is related to dyslexia, migraine, or visual discomfort, for example. The prevalent viewpoint on the causes of visual stress is that the striped patterns caused by reading texts, especially on digital displays, overstimulate a hyper-excitable visual cortex.

Several studies showed that the over-stimulation of the visual cortex could be alleviated not only with tinted lenses or colored overlays but also by removing a particular range of spatial frequencies of the visual stimuli, like reading texts, around the spatial frequency of 3 cycles per degree.

Hence, the present invention proposes a solution to decrease the amplitude of spatial frequencies around this value in visual stimuli, and as a consequence, decrease the causes of visual stress.

More precisely, the invention relates to a lens element 1 intended to be worn by a wearer with a modulation transfer function attenuated around 3 cycles per degree. The modulation transfer function is defined as the response of an optical system, in terms of contrast, to a periodic sine-wave pattern passing through this optical system, as a function of its spatial frequency.

Specifically, the invention aims at providing a specific lens design so as to reduce the value of modulation transfer function (e.g. modulation rate of the modulation transfer function) in a specific range of spatial frequencies (for example over the range of spatial frequencies comprised between 1 and 5 cycles per degree, typically around 3 cycles per degree), so that we can decrease the energy of the visual stress defining over the range of spatial frequencies comprised between 1 and 10 cycles per degree while preserving the values of the modulation transfer function (e.g. modulation rate) over the range of spatial frequencies pertaining to reading task, e.g for spatial frequencies comprised 1 and 5 cycles per degree, 15 and 20 cycles per degree and 20 and 30 cycles per degree.

In the context of the present invention, the term "lens element" can refer to an uncut optical lens, or a contact lens, or a spectacle lens edged to fit a specific spectacle frame, or an ophthalmic lens and an optical device adapted to be positioned on the ophthalmic lens. In the latter case, the optical device may be positioned on the front or back surface of the ophthalmic lens.

Figure 1:
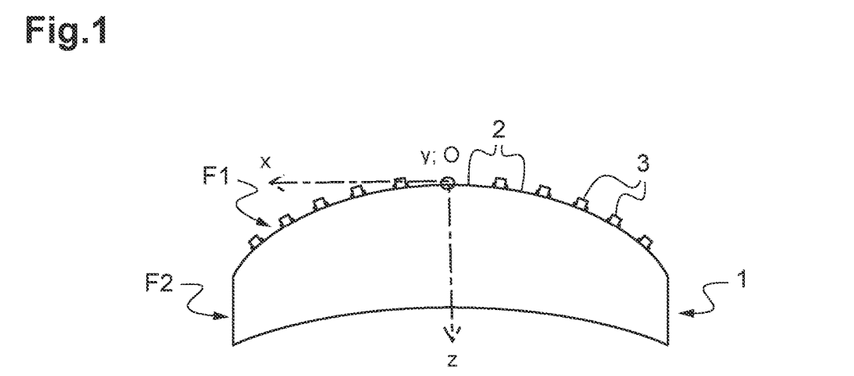
FIG. 1 shows a schematic axial cut view of a lens element according to the invention.

As illustrated in FIG. 1, the lens element 1 comprises a front face F1 directed towards an object side, and a rear face F2 closer to the eye of the wearer in comparison to the rear face.

The lens element 1 comprises a prescription portion 2 providing a dioptric correction based on a prescription of the wearer, and a plurality of lenslets 3. Typically, the lens element 1 shown on FIG. 1 is a manufactured lens arranged to be worn by a wearer. In a variant, the lens element shown on FIG. 1 can be an optical design of the lens element 1.

The prescription portion 2 is configured to provide to the wearer a dioptric correction based on a prescription of the wearer in standard wearing conditions.

The term "prescription" is to be understood to mean a set of characteristics of optical power, of astigmatism, of prismatic deviation, determined by an eye care practitioner in order to correct the vision defects of the wearer. For example, the prescription for an ametropic wearer comprises the values of optical power and of astigmatism with an axis for distance vision.

The wearing conditions are to be understood as the position of the lens element 1 with respect to the eye of the wearer, for instance defined by a pantoscopic angle, a cornea to lens distance, a pupil to cornea distance, an eye rotation center (ERC) to pupil distance and a wrap angle.

The pantoscopic angle is the angle in the vertical plane between the normal to the rear surface of the lens element 1 and the visual axis of the eye in the primary position (usually considered to be the horizontal direction, when the wearer gazes straight ahead).

The cornea to lens distance is the distance along the visual axis of the eye in the primary position between the cornea and the back surface of the lens element 1.

The pupil to cornea distance is the distance along the visual axis of the eye between its pupil and its cornea.

The ERC to pupil distance is the distance along the visual axis of the eye between its ERC and its pupil.

The wrap angle is the angle in the horizontal plane between the normal to the rear surface of the lens element 1 and the visual axis of the eye in the primary position.

An example of standard wearing conditions may be defined by a pantoscopic angle of −8°, a cornea to lens distance of 12 mm, a pupil to cornea distance of 2 mm, an ERC to pupil distance of 11.5 mm and a wrap angle of 0°.

At least part, or all among the plurality of lenslets 3 may be located on the front face of the lens element 1.

Alternatively, at least part, or all among the plurality of lenslets 3 may be located on the rear face of the lens element 1.

Another possibility is that at least part, or all among the plurality of lenslets 3 is located between the front face and the rear face of the lens element 1.

Alternatively, at least part, or all among the plurality of lenslets 3 may be formed on a film, in a form of a patch deposited on at least one of the front face and the rear face of the lens element 1.

In a variant, at least part, or all among the plurality of lenslets 3 may be formed by laminating on at least one of the front face and the rear face of the lens element 1.

The shape, size and location of each lenslet 3 is designed so that at least one portion of the lens element 1 comprises a modulation transfer function (MTF) whose values over a range of spatial frequencies comprised between 1 and 5 cycles per degree are lower or equal to 0.6.

For instance, at least one portion of the lens element 1 comprises a modulation transfer function whose values at a spatial frequency of 3 cycles per degree is lower or equal to 0.6. Preferably, at least one portion of the lens element 1 comprises a modulation transfer function whose values at a spatial frequency of 3 cycles per degree is lower or equal to 0.5. More preferably, at least one portion of the lens elements 1 comprises a modulation transfer function whose values at a spatial frequency of 3 cycles per degree is lower or equal to 0.4.

For instance, the value of the modulation transfer function of the lens element 1 is higher than 0.6 for spatial frequencies below 1 cycle per degree and higher than 0.2, more preferably higher than 0.4 for spatial frequencies between 5 cycles per degree and 15 cycles per degree. Therefore, by ensuring a rather good MTF in higher spatial frequencies, for instance between 5 and 15 cycles per degree, the lens element 1 according to the invention can provide good visual acuity for distant objects/letters in addition to the visual stress decrease in reading.

It means that the modulation transfer function of the lens element comprises values higher than 0.6 for spatial frequencies below 1 cycle per degree and values higher than 0.4 for spatial frequencies between 5 cycles per degree and 15 cycles per degree. In this example, the modulation transfer function of the lens element comprises values over the range of spatial frequencies between 5 cycles per degree and 15 cycles superior to the values over the range the spatial frequencies between 1 and 5 cycles per degree, preferably superior to the value of the spatial frequency of 3 cycles per degree. It means that the modulation transfer function is attenuated for spatial frequencies comprised between 1 and 5 cycles per degree, preferably for the spatial frequency of 3 cycles per degree.

For instance, the size of each lenslet 3 is comprised between 0.1 mm and 2.5 mm. For a lenslet 3 with a circular outline, the size is defined as the diameter of the lenslet 3.

For instance, each lenslet 3 of said plurality of lenslets 3 has another lenslet in its vicinity, and a lenslet vicinity may be a zone of radius smaller than 3 mm surrounding the contour of the lenslet.

For instance, the density of the lenslets 3 over a predetermined portion of said lens element 1 is comprised between 30 and 100%

In a first embodiment, the lenslets 3 are arranged along horizontal lines. The term "horizontal" indicates a relative position and has to be understood in the most common wearing conditions of the lens element 1, where the wearer is standing or seated. It typically corresponds to the direction defined by the axis joining the two eye rotation centers within a margin of +/−5 degrees. It can also be described as the 0-180° TABO orientation.

In the present disclosure, the lens element 1 is defined with an orthogonal frame of reference (O, x, y, z). Typically, the origin O corresponds to the optical or geometrical center of the lens element 1. Thus, the lens element 1 is arranged to extend according to two spatial directions defined along the x, y axes, which are transverse to the optical axis of the lens element 1 (z axis). The two spatial directions defined the field or a surface of the lens element 1.

In this embodiment, adjacent lenslets are aligned along one of the two spatial directions (See FIG. 1 and FIG. 2a-2c). Typically, the lenslets are aligned between two opposite edges of the lens element 1 so that the lenslets form a line between the two opposite edges of the lens element 1.

Figure 2A:
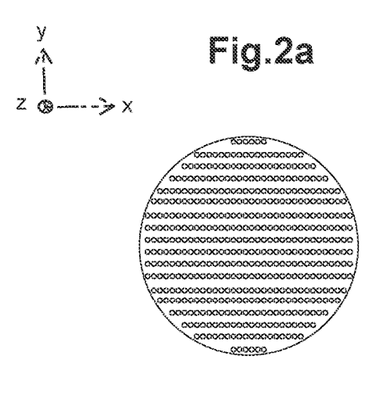
FIGS. 2a, 2b and 2c show a front expanded view of arrangements of lenslets according to a first embodiment, when projected into a facial plane perpendicular to the main axis (axis z) of the lens element.
Figure 2B:
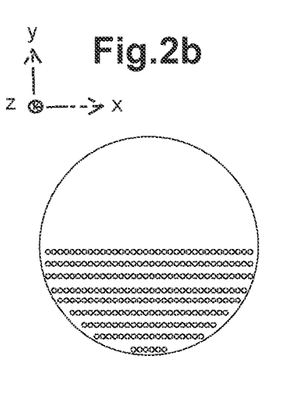

FIGS. 2a and 2b shows a front view of the first embodiment of the lens element 1, when projected into a facial plane perpendicular to the main axis (axis z) of the lens element.

It can be observed that each contiguous lenslets are aligned along a same direction (parallel to one of the radial axis x, y of the lens element 1) so that the contiguous lenslets form a horizontal line in the projection plane.

On each horizontal line, the lenslets 3 are contiguous. By contiguous, it is meant that the lenslets 3 are in actual contact: they touch each other along a boundary or at a point.

In this first embodiment, the lenslets 3 may be of several different types: unifocal, multifocal or progressive.

When the lenslets 3 are unifocal, they can have different shapes: spherical, aspherical, torical.

In a first example, the plurality of lenslets 3 covers the whole surface of the lens element 1 as illustrated on FIG. 2a. In a second example, the plurality of lenslets 3 covers the lower half of the lens element 1 as illustrated on FIG. 2b. In a third example, the plurality of lenslets 3 forms a rectangular array contained in the lower half of the lens element 1 as illustrated on FIG. 2c.

Figure 3:
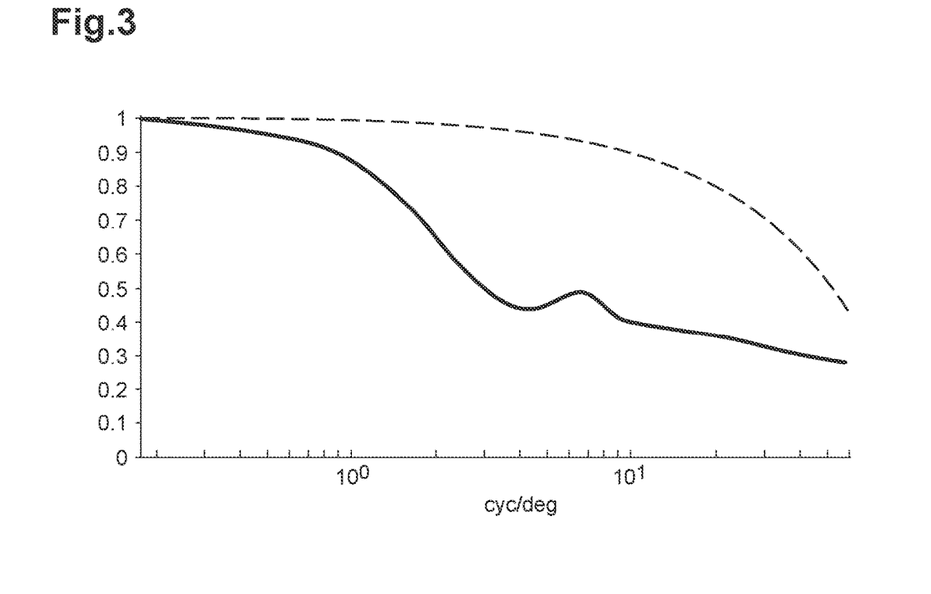
FIG. 3 shows a comparison of the modulation transfer functions of a lens element according to the first embodiment and a prior art lens.

FIG. 3 shows a comparison between the horizontal axis profile of the modulation transfer functions of, on one side, a lens element 1 according to the invention (plain curve) with a plurality of aspherical lenslets of size around 1.1 mm spaced by a distance between the apex of the lenslets of 2.4 mm and arranged in horizontal lines covering 40% of the surface of the lens element 1 and on the other side, of a regular single vision lens (dashed curve).

In the present disclosure, the modulation transfer functions are implemented by computer.

Typically, the modulation transfer function of a portion of the lens element 1 is computed by selecting said portion of the lens element 1 with a simulated aperture (i.e. a diaphragm) referred to in the following as a pupil positioned on the optical design of the lens element 1 (a simulated optical design of the lens element). Preferably, the pupil has a center that is centered on a potential central vision gaze of the wearer, for example for potential central vision gazes of the wearer comprised between 0 and 20 degrees defined from the two radial directions of the lens element 1. Typically, such angles correspond to points spaced from the center O of the lens element 1 by a distance comprised between 0 millimeter and 15 millimeters corresponding typically to the gaze position in lens element during reading with single vision lenses.

Thus, it is possible to compute the modulation transfer function on different portions of the lens element 1 by spatially scanning the surface (or field of view) of the lens element 1 using the pupil defined in different positions of the lens element.

Typically, the aperture or the pupil has a circular shape having a diameter comprised between 4 millimeters and 8 millimeters to simulate the variation of the usual pupil size of a wearer.

In addition, for the computations, the circular portion of the lens element 1 selected via the pupil (e.g aperture) comprises a part of the lenslets or all the lenslets of the lens element 1. In the present disclosure, the density of the lenslets over the portion selected via the pupil is at least of 30%, typically comprised between 70% and 100% when the lenslets are contiguous and comprised between 30% and 50% when the lenslets are not contiguous. Preferably, the circular portion comprises a half portion presenting lenslets and another half portion without any lenslet.

In the present disclosure, the modulation transfer functions are computed with process known to the skilled person, for example using software allowing to simulate the lens element 1.

Typically, the Point Spread Function (PSF) giving the degree of spreading (blurring) in the image of a point object throughout the portion of the lens element 1 selected by the pupil is computed. To this end, the point spread function is computed, for example on a plane simulating the retina surface, using typically a point source emitting in the monochromatic or polychromatic visible spectrum between 400 nm and 780 nm ($\lambda$). Advantageously, the Point Spread Function is calculated for a central wavelength between 540 to 560 nm, for example at 550 nm. Then, the modulation transfer function is computed based on the Fourier transform of the computed Point Spread Function.

In the present disclosure, the horizontal axis profile of the modulation transfer function corresponds to the variation of the modulation transfer function estimated or computed along the horizontal axis x of the lens element. Typically, the horizontal modulation transfer function corresponds to a cut view of the Fourier Transform of the Point Spread Function along the horizontal axis x of the lens element 1. In contrast, the vertical axis profile of the modulation transfer function corresponds to the variation of the modulation transfer function computed or estimated along the vertical axis y of the lens element 1. The vertical modulation transfer function corresponds to a cut view of the Fourier Transform of the Point Spread Function along the vertical axis y of the lens element.

In the following examples, the pupil size relates to or is defined as a specific portion of the lens element 1. It means that a pupil diameter of 4 mm corresponds to a circular portion of 4 mm diameter defined on the lens element 1. Thus, it refers to a diameter of a specific portion of the lens element 1.

The modulation transfer functions in the examples of the present disclosure are computed with a monochromatic light source at the wavelength of 550 nm and using a pupil diameter (aperture) of 4 mm. The portion of the lens element 1 selected via the pupil diameter is located in an area of the lens element 1 comprising at least one lenslet as explained above. In addition, the circular portion selected via the pupil diameter (or aperture) comprises in that case a half portion presenting lenslets and another half portion without any lenslet.

On FIG. 3, it can be observed that the modulation transfer function decreases over the range of spatial frequencies comprised between 0 and 2 cycles per degree. The modulation transfer function of the lens element 1 according to the invention presents a valley having a minimum value equal to 0.45 around the 3 cycles per degree spatial frequency. Then, the modulation transfer function increases over the range of spatial frequencies comprised between 3 and 5 cycles per degree. Here, it can be observed that the modulation transfer function presents a peak between 3 and 7 cycles per degree having a maximum value equal to 0.5 around 6-7 cycles per degree. The modulation transfer function decreases over the range of spatial frequencies comprised between 7 and 60 cycles per degree.

It means that the modulation transfer function is attenuated for spatial frequencies comprised between 1 and 5 cycles per degree, preferably for the spatial frequencies around 3 cycles per degree, then increased for spatial frequencies comprised between 5 and 7 cycles per degree and finally attenuated for spatial frequencies higher than 10 cycles per degree.

In other words, it means that the modulation transfer function presents values over the range of spatial frequencies comprised between 3 and 7 cycles per degree which are higher than values of the modulation transfer function over the range of spatial frequencies comprised between 1 and 3 cycles per degree.

It can also be seen that the modulation rate of modulation transfer function of the lens element 1 over the range of spatial frequencies comprised between 0 cycles per degree and 60 cycles per degree is lower than the modulation rate of the modulation transfer function pertaining to the regular single vision lens (dashed curve).

Figure 4:
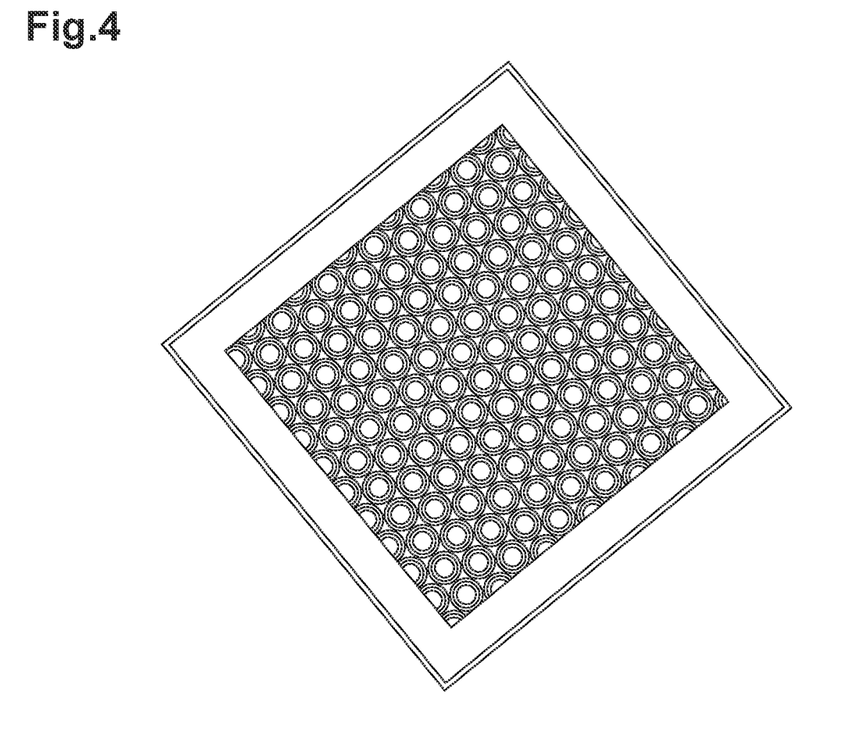
FIG. 4 shows a front expanded view of an arrangement of lenslets according to a second embodiment, when projected into a facial plane perpendicular to the main axis (axis z) of the lens element.
Figure 5:
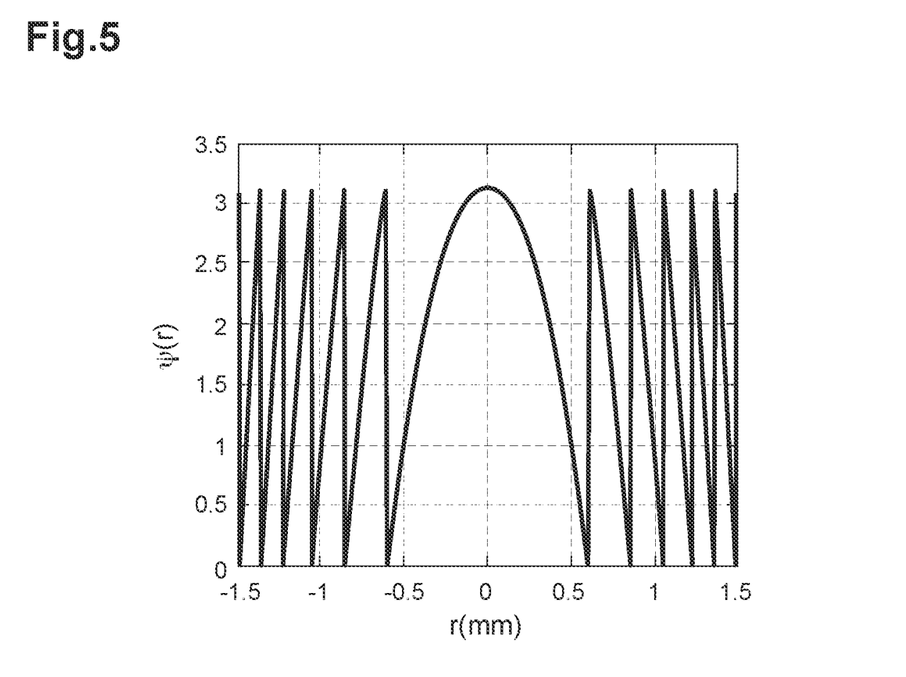
FIG. 5 shows an example of radial profile of diffractive Pi-Fresnel lenslets.

In a second embodiment, the lenslets 3 are arranged in a contiguous manner on a regular hexagonal array as illustrated on FIG. 4. The regular hexagonal array can cover the whole surface of the lens element 1 (defined with the axes x, y) or only a portion of the lower part of the lens element 1. In this embodiment, the lenslets are so-called diffractive Pi-Fresnel lenslets. Diffractive Pi-Fresnel lenses are Fresnel lenslets presenting a radial profile such as the one illustrated in FIG. 5. The phase function of the diffractive Pi-Fresnel lenslets has $\pi$ phase jumps at the nominal wavelength $\lambda_0$. $\lambda_0$ is considered to be, for example, 550 nm for human eye vision applications. The diffractive Pi-Fresnel lenslets present an axis perpendicular to their faces and passing through a center. Diffractive Pi-Fresnel lenses mainly diffract in two diffraction orders associated to two dioptric powers $P_0(\lambda_0)$ and $P_1(\lambda_0)$. This means that, when receiving light, they concentrate light on two distinct areas on their axis.

For instance, the dioptric power $P_0(\lambda_0)$ is comprised in a range of +/−0.12 diopter centered around a prescription optical power of the prescription portion.

For instance, the dioptric power $P_1(\lambda_0)$ is such that the absolute value of its difference with the prescription optical power is comprised between 1 diopter and 10 diopters. Preferably, the dioptric power $P_1(\lambda_0)$ is such that the absolute value of its difference with the prescription optical power is comprised between 2 diopters and 6 diopters.

Figure 6:
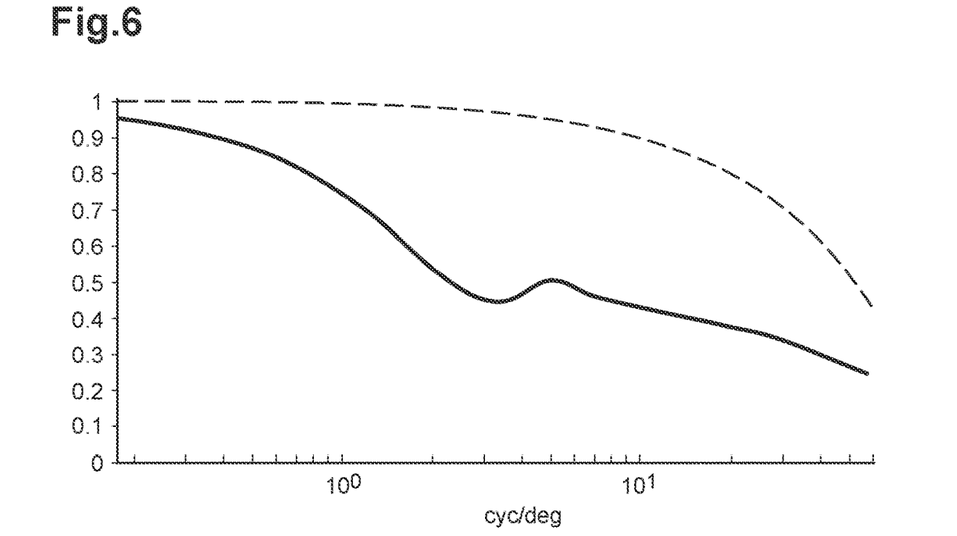
FIG. 6 shows a comparison of the modulation transfer functions of a lens element according to the second embodiment and a prior art lens.

FIG. 6 shows a comparison of the modulation transfer functions of, on one hand, the lens element 1 according to the second embodiment with Pi Fresnel lenslets with dioptric powers $P_0(\lambda_0)$ and $P_1(\lambda_0)$ equal respectively to 0 diopter and 4 diopters (plain curve) arranged in a hexagonal array whose step is 2 mm covering 100% of the surface of the lens element 1 and, on the other hand, of a regular single vision lens (dotted curve). The modulation transfer functions are monochromatic, computed at the wavelength of 550 nm and for a pupil diameter of 4 mm. Again, in the case of the lens element 1 according to the invention, the modulation transfer function presents a valley having a minimum value comprised between 0.40 and 0.50 (here equal to 0.43) around the 3 cycles per degree spatial frequency. Then, the modulation transfer function increases over the range of spatial frequencies comprised between 3 and 5 cycles per degree. Here, it can be observed that the modulation transfer function presents a peak between 3 and 7 cycles per degree having a maximum value equal to 0.5 around 5 cycles per degree. The modulation transfer function decreases over the range of spatial frequencies comprised between 7 and 60 cycles per degree.

It means that the modulation transfer function is attenuated for spatial frequencies comprised between 1 and 4 cycles per degree, preferably for the spatial frequency around 3 cycles per degree, then increased for spatial frequencies comprised between 3 and 7 cycles per degree and finally attenuated for spatial frequencies higher than 10 cycles per degree.

In other words, it means that the modulation transfer function presents values over the range of spatial frequencies comprised between 3 and 7 cycles per degree which are higher than values of the modulation transfer function over the range of spatial frequencies comprised between 1 and 3 cycles per degree.

It can also be seen that the modulation rate of the modulation transfer function of the lens element 1 over the range of spatial frequencies comprised between 0 and 60 cycles per degree is lower than the modulation rate of the modulation transfer function pertaining to the regular single vision lens (dashed curve).

A third embodiment pertains to a lens element 1 dedicated to more sensitive patients suffering more from visual stress than others. For those, a higher level of filtering of the disturbing spatial frequencies around 3 cycles per degree. In other words, in this embodiment, the lowering of the modulation transfer function around 3 cycles per degree spatial frequency is stronger. It turns out that the reading performances of standard (i.e. non dyslexic) patients were found not affected by a dioptric blur of 0.5 diopter. By dioptric blur, it is meant an equivalent defocus of 0.5 diopter with respect to emmetropic, or corrected, vision. The highest spatial frequency ranges involved in reading tasks are between 10 and 15 cycles per degree and between 20 and 30 cycles per degree. Those ranges correspond to the level of resolution needed for words and individual letters recognition.

Therefore, the lens element 1 according to this third embodiment presents a modulation transfer function, on one hand, diminished in a stronger manner around the 3 cycles per degree spatial frequency, and on the other hand, comparable to (and even better than) the modulation transfer function of a lens introducing a dioptric blur of 0.5 diopter for other spatial frequency ranges.

In this third embodiment, the lenslets of this lens element 1 are contiguous refractive bifocal lenslets.

Figure 7:
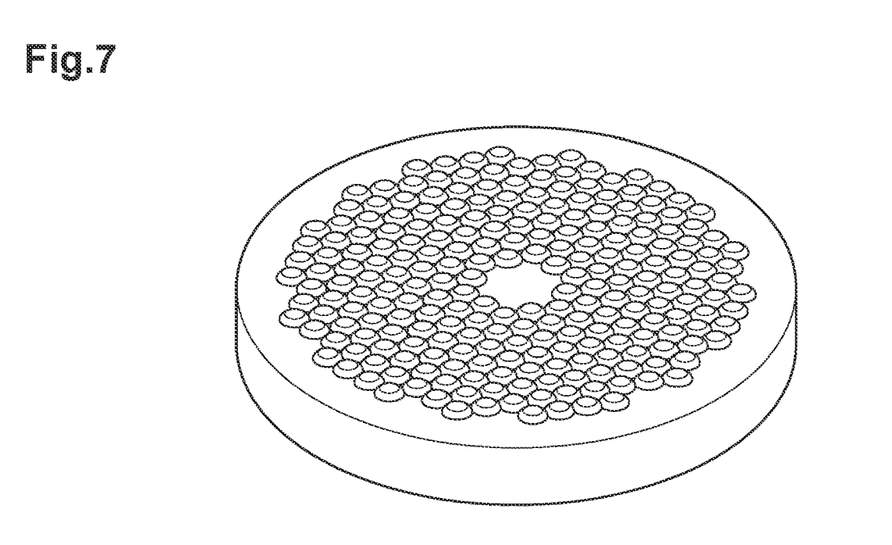
FIG. 7 shows an arrangement of lenslets according to a third embodiment.
Figure 8:
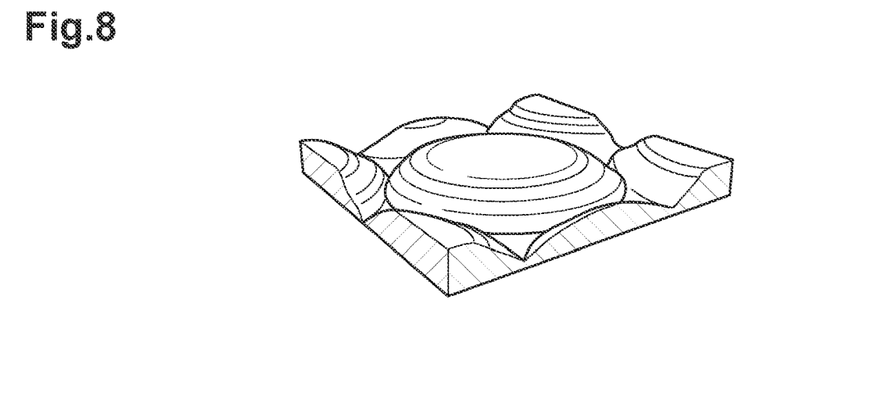
FIG. 8 shows the geometry of a refractive bifocal lenslet.

For instance, the refractive bifocal lenslets are arranged in a hexagonal array arrangement outside a central portion, as illustrated on FIG. 7. The bifocal lenslets present a first portion consisting of a central circular zone and a second portion consisting of a peripheral annular zone. The section profile of the peripheral annular zone may be of any type, for instance spherical or aspherical. For instance, the first portion creates a first portion optical power, and the second portion creates a second portion optical power. FIG. 8 illustrates the geometry of the refractive bifocal lenslets.

For instance, the diameter of the central circular zone is comprised between 0.5 and 1.5 mm. Preferably, the diameter of the central circular zone is comprised between 1 and 1.25 mm.

For instance, the peripheral annular zone has an external diameter comprised between 1 and 3 mm. Preferably, the peripheral annular zone has an external diameter comprised between 1.3 and 1.8 mm.

For instance, the first portion creates a first portion optical power comprised in a range of +/−0.12 diopter centered around a prescription optical power of the prescription portion.

For instance, the second portion creates a second portion optical power such that the absolute value of the difference between the prescription optical power and the second portion optical power is comprised between 1 diopter and 10 diopters. Preferably, the second portion creates a second portion optical power such that the absolute value of difference between the prescription optical power and the second portion optical power is comprised between 2 diopters and 6 diopters.

Figure 9:
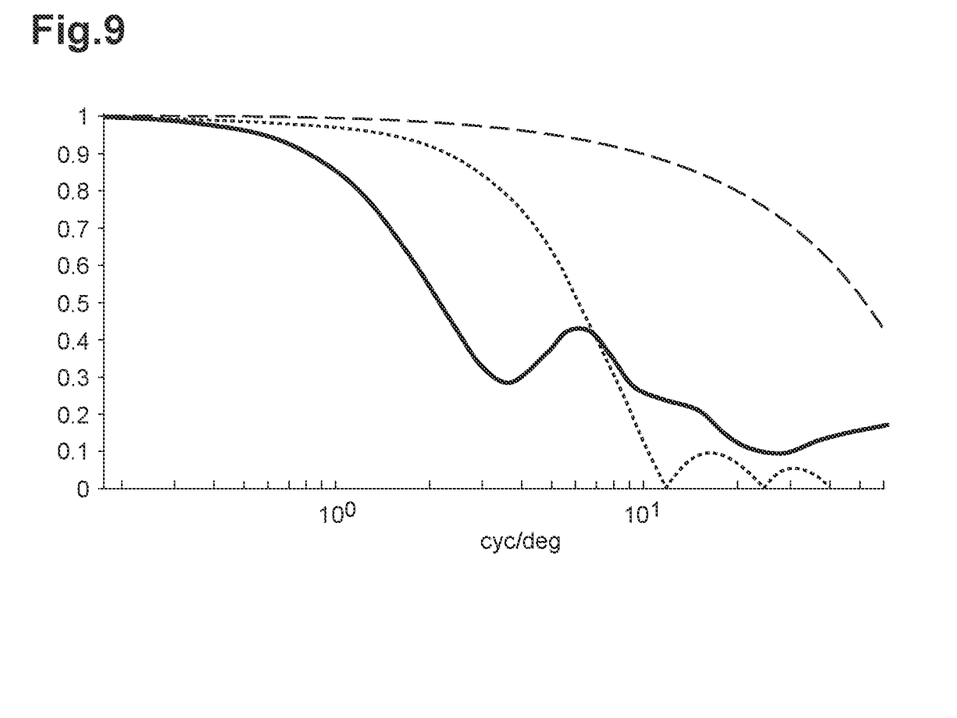
FIG. 9 shows a comparison of the modulation transfer functions of a lens according to the third embodiment and two prior art lenses.

FIG. 9 shows a comparison of the modulation transfer functions of a diffraction limited lens (dotted line), a single vision lens introducing a defocus of +0.5 diopter (chain-dotted line), and of a lens element according to the third embodiment where the bifocal lenslets have an additional central power of 0 diopter, a refractive peripheral power of 3.5 diopters, a central zone diameter of 1.41 mm, where the distance between two lenslets centers is 2 mm and where the portion of the lens element 1 covered by the hexagonal array is 100%. The modulation transfer functions are monochromatic at the wavelength of 550 nm and were computed for a pupil diameter of 4 mm. It can be seen that the decrease in modulation at the 3 cycles per degree spatial frequency is stronger than in the first embodiment and the second embodiment (modulation transfer function value of about 0.32).

Figure 2C:
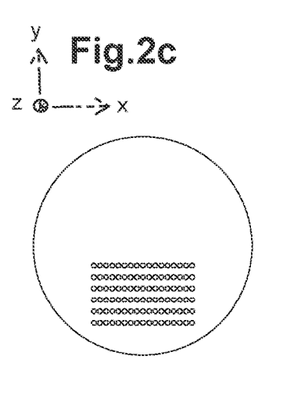
Figure 10:
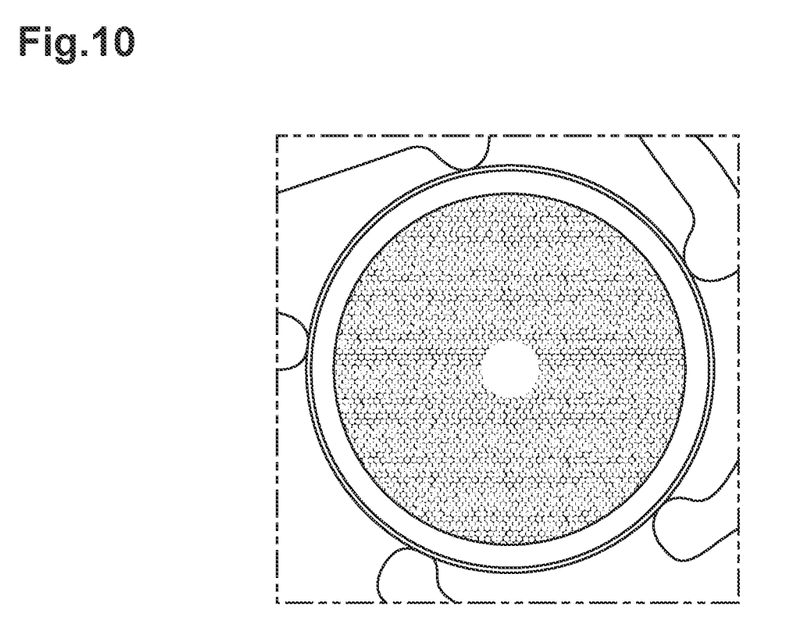
FIG. 10 shows a front view of an arrangement of lenslets according to a fourth embodiment, when projected into a facial plane perpendicular to the main axis (axis z) of the lens element.

In a fourth embodiment, the lenslets are refractive small high power lenslets. The lenslets are spherical. In a variant, the lenslets might be aspherical. The small high power lenslets present a circular outline and a center. For example, the small high power lenslets are contiguous as illustrated in FIG. 10 and organized in a hexagonal array with an empty central region. Preferably, the lenslets are arranged in horizontal lines as illustrated in FIG. 2b or 2c.

For instance, the small high power lenslets have a mean optical power comprised between 12 and 22 diopters. Preferably, the small high power lenslets have a mean optical power comprised between 14 and 20 diopters. More preferably, the small high power lenslets have a mean optical power comprised between 16 and 18 diopters.

Advantageously, an arrangement of refractive small high power lenslets allows for adjusting and managing the level of reduction of the contrast at the 3 cycles per degree spatial frequency while maintaining very good performances (i.e. high MTF values) at high and low spatial frequencies. Regarding the low spatial frequencies, they are very important in the first step of fast scene recognition and categorization. If they are too much degraded, it might impact scene and object perception thus high contrast is needed for those frequencies. Regarding the high spatial frequencies, high contrast is needed for them to ensure good visual acuity.

Figure 11:
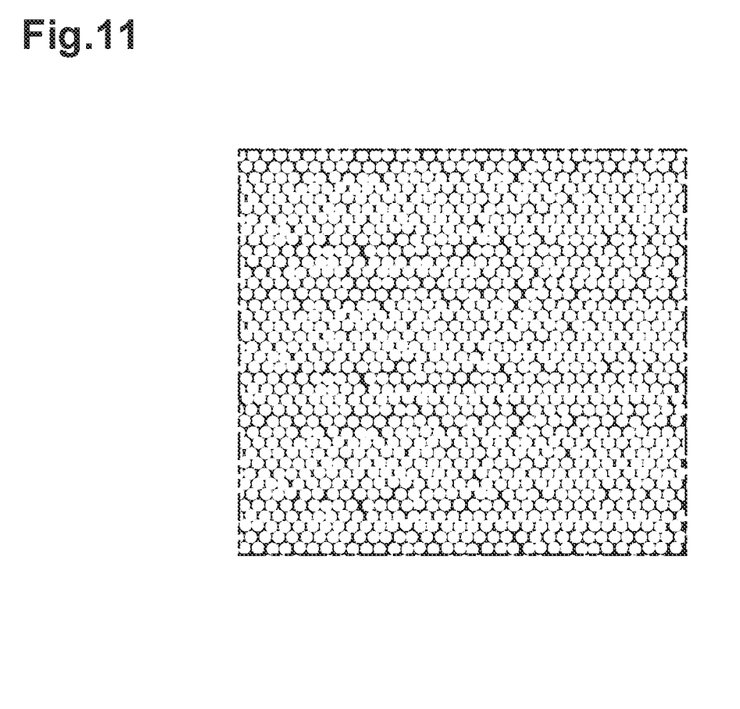
FIG. 11 shows an expanded view of a variant of an arrangement of lenslets according to the fourth embodiment.

To reduce the periodic interference bounces in the modulation transfer function curve introduced by the small aperture of the refractive small high power lenslets and improve the performances of the lens element 1 according to the fourth embodiment, the spatial organization of the refractive small high power lenslets might be adjusted by introducing some randomization on the position of the centers of the refractive small high power lenslets. FIG. 11 is a representation of such a hexagonal arrangement with randomization of the positions of the centers of the refractive small high power lenslets.

For instance, for at least part of the plurality of small high power lenslets, the position of each small high power lenslets center is offset by a randomized distance less than 0.1 mm. Preferably, the position of each small high power lenslets center is offset by a randomized distance less than 0.08 mm.

Figure 12:
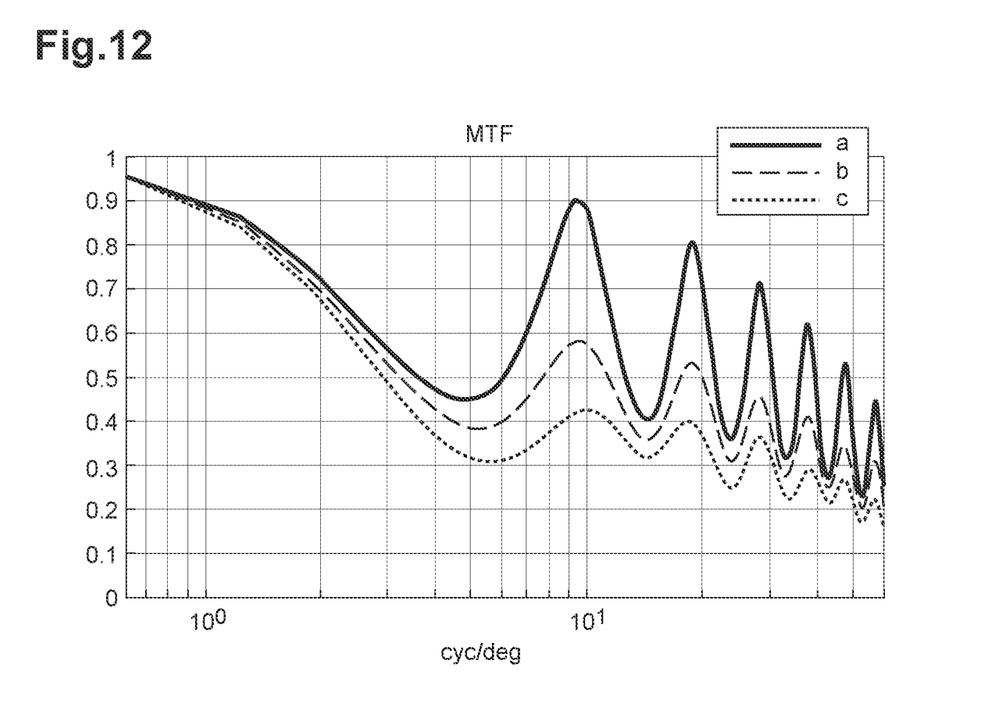
FIG. 12 shows the modulation transfer functions of three examples of lens elements according to the fourth embodiment.

FIG. 12 shows the modulation transfer functions for different arrangements of the refractive small high power lenslets of the fourth embodiment. The refractive small high power lenslets have a mean optical power of 17 diopters and a diameter of 0.3 mm. The modulation transfer functions correspond to the horizontal cross sections and were computed with a pupil diameter equal to 4 mm. Those arrangement correspond to respectively a hexagonal arrangement with no randomization of the position of the centers of the lenslets, the distance between the centers of a lenslet and another lenslet in its vicinity being equal to 0.3 mm (solution a), a hexagonal arrangement with a randomized spatial variation of the center of each lenslet of +/−0.06 mm (solution b) and +/−0.08 mm (solution c).

It can be inferred from FIG. 12 that the introduced randomization reduces the interference bounces in the modulation transfer function curves. The higher the level of introduced randomization, the lower the modulation transfer function value.

Alternatively, the randomization could be introduced by varying, instead of the position of the center of the lenslet, the diameter of the lenslet.

For instance, the diameters of the small high power lenslets could be comprised between 0.1 and 0.7 mm. Preferably, the diameters of the small high power lenslets could be comprised between 0.2 and 0.4 mm.

In a fifth embodiment, the lens element 1 according to the invention corresponds to one lens element 1 according to one among each of the first, second, third and fourth embodiments, on which a gradient law has been applied. By gradient law, it is meant a variation function by which a parameter of the lens element 1 is varied in order to further decrease the modulation transfer function around the 3 cycles per degree spatial frequency and/or to increase the modulation transfer function away from this spatial frequency.

Figure 13:
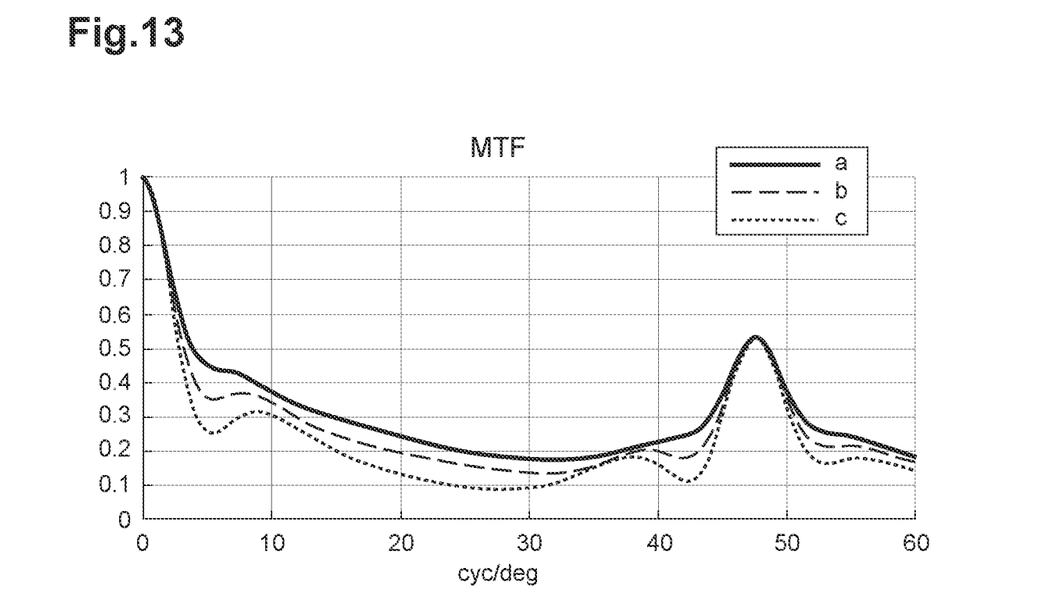
FIG. 13 shows the effect of a first gradient law on the modulation transfer function of a lens element according to a first example of the fifth embodiment.

In a first example, the lens element is first designed according to the third embodiment, that is, with a plurality of refractive bifocal lenslets. The parameter of the lens element 1 that is varied is the surface ratio between the second portion i.e. the peripheral annular zone, and the first portion. FIG. 13 shows the change in the modulation transfer function when decreasing the ratio of the first portion from 54% of the refractive bifocal lenslet whole surface (case a), to 45% (case b), to 36% (case c). More precisely, the considered refractive bifocal lenslets were arranged in a hexagonal array, with neighbouring centers spaced by 1.5 mm. The first portion creates a null first optical power. The second portion creates a second optical power of 3.5 diopters. The central circular zone diameter varied from 1.16 mm to 1.06 mm, to 0.95 mm.

The modulation transfer functions are monochromatic, assessed at the wavelength of 550 nm, correspond to the horizontal cross sections and were computed for a pupil diameter of 4 mm. It can be observed that, the smaller the first portion, the smaller the modulation transfer function value at low spatial frequencies. Therefore, the surface ratio between the second portion and the first portion of the bifocal lenslets is one parameter based on which the lens element 1 may be optimized to achieve a desired modulation transfer function.

Figure 14:
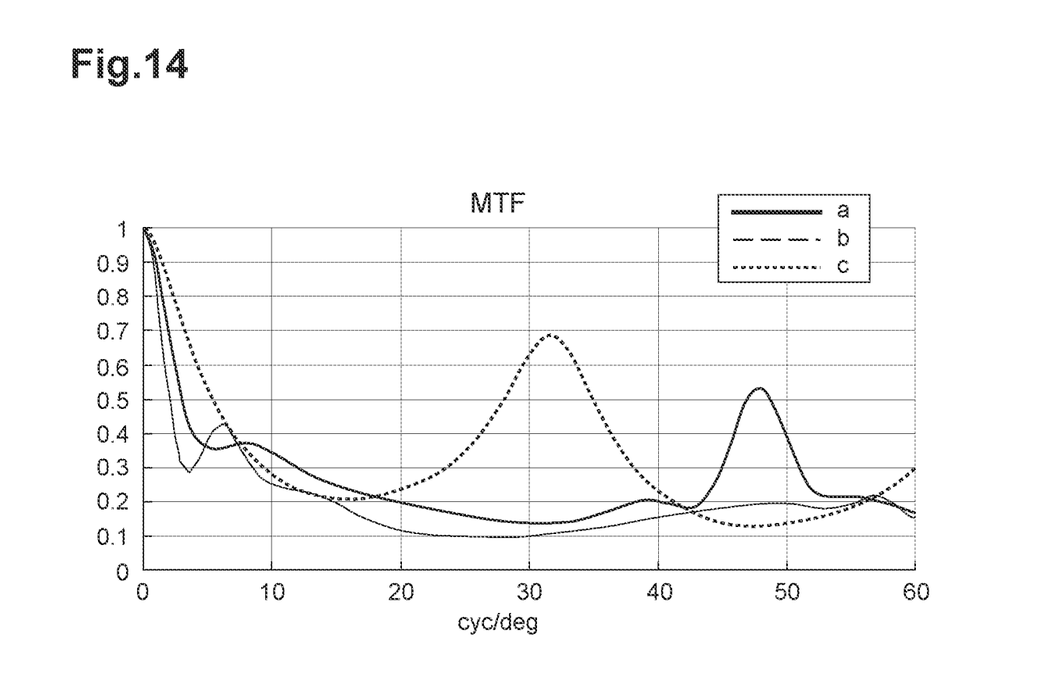
FIG. 14 shows the effect of a second gradient law on the modulation transfer function of a lens element according to a second example of the fifth embodiment.

In a second example, the lens element is first designed according to the third embodiment, that is, with a plurality of refractive bifocal lenslets. The parameter of the lens element 1 that is varied is the distance between the centers of two neighbouring refractive bifocal lenslets. FIG. 14 shows the change in the modulation transfer function when decreasing the distance between the centers of two neighbouring refractive bifocal lenslets from 2 mm (case a), to 1.5 mm (case b), to 1 mm (case c). More precisely, the central circular zone diameter varied from 1.41 mm, to 1.06 mm, to 0.70 mm. The surface ratio of the central circular zone with respect to the whole refractive bifocal lenslet surface is kept equal to 45% in all cases. In all cases, the first optical portion power created by the central circular zone is null. In all cases, the second portion optical power created by the peripheral annular zone is kept equal to 3.5 diopters.

The modulation transfer functions are monochromatic, assessed at the wavelength of 550 nm, correspond to the horizontal cross sections and were computed for a pupil diameter of 4 mm. It can be observed that, the larger the spacing between two neighbouring refractive bifocal lenslets, the lower the modulation transfer function value at low spatial frequencies. Therefore, the distance between the refractive bifocal lenslets is one parameter based on which the lens element 1 may be optimized to achieve a desired modulation transfer function.

According to the invention, other ways to design the plurality of lenslets allow tailoring the modulation transfer function of the lens element 1 in order to optimize its value around the 3 cycles per degree spatial frequency and in other spatial frequency ranges.

For instance, the lenslets may not be contiguous, or in other words, the density of lenslets might be decreased.

In another example, when the lenslets are diffractive Pi-Fresnel lenslets, the nominal wavelength $\lambda_0$ may be varied. If the nominal wavelength $\lambda_0$ is increased, the energy ratio in the +1 order will be increased, therefore, the modulation transfer function will decrease at low spatial frequencies.

The invention also relates to a computer-implemented method for determining a lens element intended to be worn by a wearer, wherein the lens element comprises a prescription portion having a first optical function configured to provide a dioptric correction based on a prescription of the wearer, and a plurality of lenslets in contact with said prescription portion, each of said lenslets providing at least one optical function which is different from the first optical function of said prescription portion; wherein the method comprises:
  providing (S1) a prescription for correcting vision of an eye of the wearer,
  determining (S2) a shape, a size and a location of each lenslet so that at least one portion of said lens element comprises a modulation transfer function (MTF) whose values over a range of spatial frequencies comprised between 1 and 5 cycles per degree are lower or equal to 0.6.

In some embodiments, the method comprises:
arranging (S3) lenslets 3 according to a regular pattern of adjacent lenslets 3, said regular pattern having a constant inter-distance between two geometrical centers of adjacent lenslets 3,
adjusting (S4) the inter-distance between two geometrical centers of adjacent lenslets 3 so as to have a random or pseudo-random arrangement.

An example of random arrangement was illustrated in FIG. 11 where some randomization on the position of the centers of the refractive small high power lenslets was introduced.

A pseudo-random arrangement of lenslets could be defined as follows. Starting from a regular arrangement where the inter-distance between two geometrical centers of adjacent lenslets is constant, the center of one considered lenslet C0 has coordinates (xc0,yc0) in a plane perpendicular to the optical axis of the lens element 1, when positioned on the regular arrangement. Denoting S a characteristic size of the regular arrangement, for instance, the distance between two lenslets in a square or hexagonal arrangement, the position of the center of the considered lenslet in the pseudo-random arrangement would be (xc,yc), with for instance |xc−xc0|<P×S and |yc−yc0|<P×S, with P a percentage comprised between 0 and 100% denoting the variability of the position in the pseudo-random arrangement.

In a variant, the position of the center of the considered lenslet in the pseudo-random arrangement could be defined such that $sqrt((xc-xc0)^2+(yc-yc0)^2)<P\times S$.

The computer-implemented method as disclosed above is typically used to manufacture the lens element 1 (i.e. a physical lens element). Typically, the method for manufacturing the lens element 1 comprises:
a step of determining a design of the lens element 1 using the computer-implemented method as disclosed above,
a step of manufacturing the lens element 1 following the design.

The invention claimed is:

1. A lens element (1) intended to be worn by a wearer, comprising at least one prescription portion (2) having a first optical function configured to provide a dioptric correction of an eye of the wearer when the lens element (1) is worn by said wearer based on a prescription of the wearer, and a plurality of lenslets (3), each lenslet (3) of said plurality of lenslets being configured to provide at least one second optical function which differs from the first optical function,
wherein each lenslet (3) has a shape, a size and a position such that at least one portion of said lens element (1) has a modulation transfer function (MTF) whose values are configured so that the modulation transfer function of said lens element 1 over a range of spatial frequencies comprised between 1 and 5 cycles per degree are lower or equal to 0.6.

2. The lens element (1) according to claim 1, wherein:
each lenslet of said plurality of lenslets (3) has a diameter between 0.1 mm and 2.5 mm,
each lenslet of said plurality of lenslets (3) has another lenslet in its vicinity;
the density of the lenslets (3) over a predetermined portion of said lens element (1) is greater than 30%.

3. The lens element (1) according to claim 1, wherein the value of said modulation transfer function (MTF) at a spatial frequency of 3 cycles per degree is lower or equal to 0.4.

4. The lens element (1) according to claim 1, comprising a front surface (F1) and a rear surface (F2), said rear surface (F2) being closer to the eye of the wearer when the lens element (1) is worn by said wearer, wherein the lenslets (3) are located on at least one of the two surfaces (F1, F2) and/or between the two surfaces.

5. The lens element (1) according to claim 1, wherein at least a first part of the plurality of lenslets (3) are contiguous.

6. The lens element (1) according to claim 1, wherein at least a second part of the plurality of lenslets (3) are arranged according to a predefined pattern.

7. The lens element (1) according to claim 6, wherein at least two lenslets of said at least second part of the plurality of lenslets (3) are arranged to form a horizontal line.

8. A lens element (1) according to claim 6, wherein at least two lenslets of said at least second part of the plurality of lenslets (3) are unifocal and arranged contiguously.

9. The lens element (1) according to claim 6, wherein:
each lenslet of at least a third part of the plurality of lenslets (3) is unifocal and has a mean optical power comprised between 12 and 22 diopters.

10. The lens element (1) according to claim 9, wherein each lenslet (3) of said at least third part has a diameter comprised between 0.1 and 0.7 mm.

11. The lens element (1) according to claim 1, wherein each lenslet (3) has a second optical function that is bifocal and each lenslet comprises a first portion and a second portion, wherein:
the first portion is a central circular zone of diameter comprised between 0.5 and 1.5 mm,
the second portion is a peripheral annular zone of external diameter comprised between 1 and 3 mm.

12. The lens element (1) according to claim 1, wherein each lenslet (3) has a second optical function that is bifocal and each lenslet (3) is a diffractive Pi-Fresnel lenslet.

13. The lens element (1) according to claim 12, wherein the diffractive Pi-Fresnel lenslets provide a first main diffractive order and a second diffractive order, wherein:
the first main diffractive order is configured to produce a first dioptric power comprised in a range of +/−0.12 diopter centered around a prescription optical power of the prescription portion,
the second diffractive order is configured to produce a second dioptric power such that the absolute value of the difference between the prescription optical power and the second dioptric power is comprised between 1 diopter and 10 diopters.

14. A computer-implemented method for determining a lens element (1) intended to be worn by a wearer,
wherein the lens element (1) comprises a prescription portion having a first optical function configured to provide a dioptric correction based on a prescription of the wearer, and a plurality of lenslets in contact with said prescription portion, each of said lenslets providing at least one optical function which is different from the first optical function of said prescription portion;
wherein the method comprises:
providing (S1) a prescription for correcting vision of an eye of the wearer;
determining (S2) a shape, a size and a location of each lenslet (3) so that at least one portion of said lens element (1) has a modulation transfer function (MTF) whose values over a range of spatial frequencies comprised between 1 and 5 cycles per degree are lower or equal to 0.6.

15. A method according to claim 14, wherein the method comprises:

arranging (S3) lenslets (3) according to a predefined regular pattern of adjacent lenslets, said predefined regular pattern having a constant inter-distance between two geometrical centers of adjacent lenslets, adjusting (S4) the inter-distance between two geometrical centers of adjacent lenslets so as to have a random or pseudo-random arrangement.

\* \* \* \* \*